US010535206B2

(12) United States Patent
Lopez Rubio et al.

(10) Patent No.: US 10,535,206 B2
(45) Date of Patent: Jan. 14, 2020

(54) METHOD AND APPARATUS FOR REMOTELY ASSISTED VEHICLE ASSISTANCE

(71) Applicant: FORD GLOBAL TECHNOLOGIES, LLC, Dearborn, MI (US)

(72) Inventors: David Franco Lopez Rubio, Lerma (MX); Oswaldo Perez Barrera, Texcoco (MX); Rodrigo Frieventh C, Toluca (MX); Hedy H. Morales Bolaños, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 15/870,422

(22) Filed: Jan. 12, 2018

(65) Prior Publication Data
US 2019/0221049 A1    Jul. 18, 2019

(51) Int. Cl.
| G07C 5/00 | (2006.01) |
| G09B 5/02 | (2006.01) |
| G07C 5/08 | (2006.01) |
| G09B 5/04 | (2006.01) |
| G09B 19/00 | (2006.01) |

(52) U.S. Cl.
CPC .......... *G07C 5/008* (2013.01); *G07C 5/0808* (2013.01); *G09B 5/02* (2013.01); *G09B 5/04* (2013.01); *G09B 19/00* (2013.01)

(58) Field of Classification Search
CPC . G07C 5/008; G09B 5/02; G09B 5/04; G09B 19/00; H04W 4/22

USPC ............................................. 701/31.4, 2, 33
See application file for complete search history.

(56) References Cited

U.S. PATENT DOCUMENTS

| 6,167,255 | A  | * | 12/2000 | Kennedy, III | ...... H04M 3/4228 455/414.1 |
| 9,237,242 | B2 |   | 1/2016  | Basir |  |
| 9,632,920 | B2 |   | 4/2017  | Green et al. |  |
| 9,659,301 | B1 |   | 5/2017  | Briggs et al. |  |
| 2002/0055861 | A1 | * | 5/2002 | King | ...................... G06Q 10/10 705/4 |
| 2012/0066010 | A1 | * | 3/2012 | Williams | ........... G06Q 10/0633 705/4 |
| 2013/0012238 | A1 | * | 1/2013 | Raab | ................. H04M 1/72536 455/456.3 |
| 2014/0143839 | A1 | * | 5/2014 | Ricci | ..................... H04W 12/06 726/4 |
| 2015/0172894 | A1 | * | 6/2015 | Gabel | ..................... H04W 4/02 455/404.2 |
| 2015/0365979 | A1 | * | 12/2015 | Park | ....................... H04W 4/02 455/404.2 |
| 2016/0140299 | A1 | * | 5/2016 | Al Harbi | ................ G16H 40/20 705/2 |
| 2016/0274922 | A1 |   | 9/2016 | Steidle et al. |  |
| 2017/0101054 | A1 |   | 4/2017 | Dusane |  |

* cited by examiner

*Primary Examiner* — Tan Q Nguyen
(74) *Attorney, Agent, or Firm* — Michael Spenner; Brooks Kushman P.C.

(57) ABSTRACT

A system includes a processor configured to receive a vehicle diagnostic report from a vehicle. The processor is also configured to determine that additional information is required to diagnose a problem indicated by the report. The processor is further configured to compile instructions for a user to gather the additional information and send the instructions to the vehicle in response to determining the additional information is required.

20 Claims, 3 Drawing Sheets

METHOD AND APPARATUS FOR REMOTELY ASSISTED VEHICLE ASSISTANCE

TECHNICAL FIELD

The illustrative embodiments generally relate to methods and apparatuses for remotely assisted vehicle assistance.

BACKGROUND

Drivers experience a wealth of connected services in vehicles today. On demand media playback and navigation, internet connectivity and a variety of other remotely supported services are available. Despite all of this connectivity and remote communication, drivers typically have to take a vehicle in for servicing if a problem occurs. That is, it is not often the case that a vehicle issue could be fixed by a remote technician.

In some instances, however, such as when the vehicle will not start, the driver cannot take the vehicle in for servicing. And even when the vehicle will start, many drivers avoid taking the vehicle in for maintenance because of the expectation of long waits for service. Many issues which are eventually fixed at the dealer may have been fixable by a driver at home, had the driver had the requisite knowledge to fix the problem.

SUMMARY

In a first illustrative embodiment, a system includes a processor configured to receive a vehicle diagnostic report from a vehicle. The processor is also configured to determine that additional information is required to diagnose a problem indicated by the report. The processor is further configured to compile instructions for a user to gather the additional information and send the instructions to the vehicle in response to determining the additional information.

In a second illustrative embodiment, a system includes a processor configured to receive a vehicle diagnostic report from a vehicle. The processor is also configured to determine a procedure to correct a problem indicated by the report. The processor is further configured to compile instructions for a user to complete the procedure and send the instructions to the vehicle in response to determining the procedure.

In a third illustrative embodiment, a computer-implemented method includes connecting to a predesignated expert in response to receiving a vehicle diagnostic report from a vehicle. The method also includes receiving selection, from the expert, of at least one of video, audio and images explaining how to fix a problem indicated by the diagnostic report. The method further includes transmitting instructions from the expert on how to fix the problem, including selected video, audio and/or images, to the vehicle and providing live communication between the vehicle and the expert.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
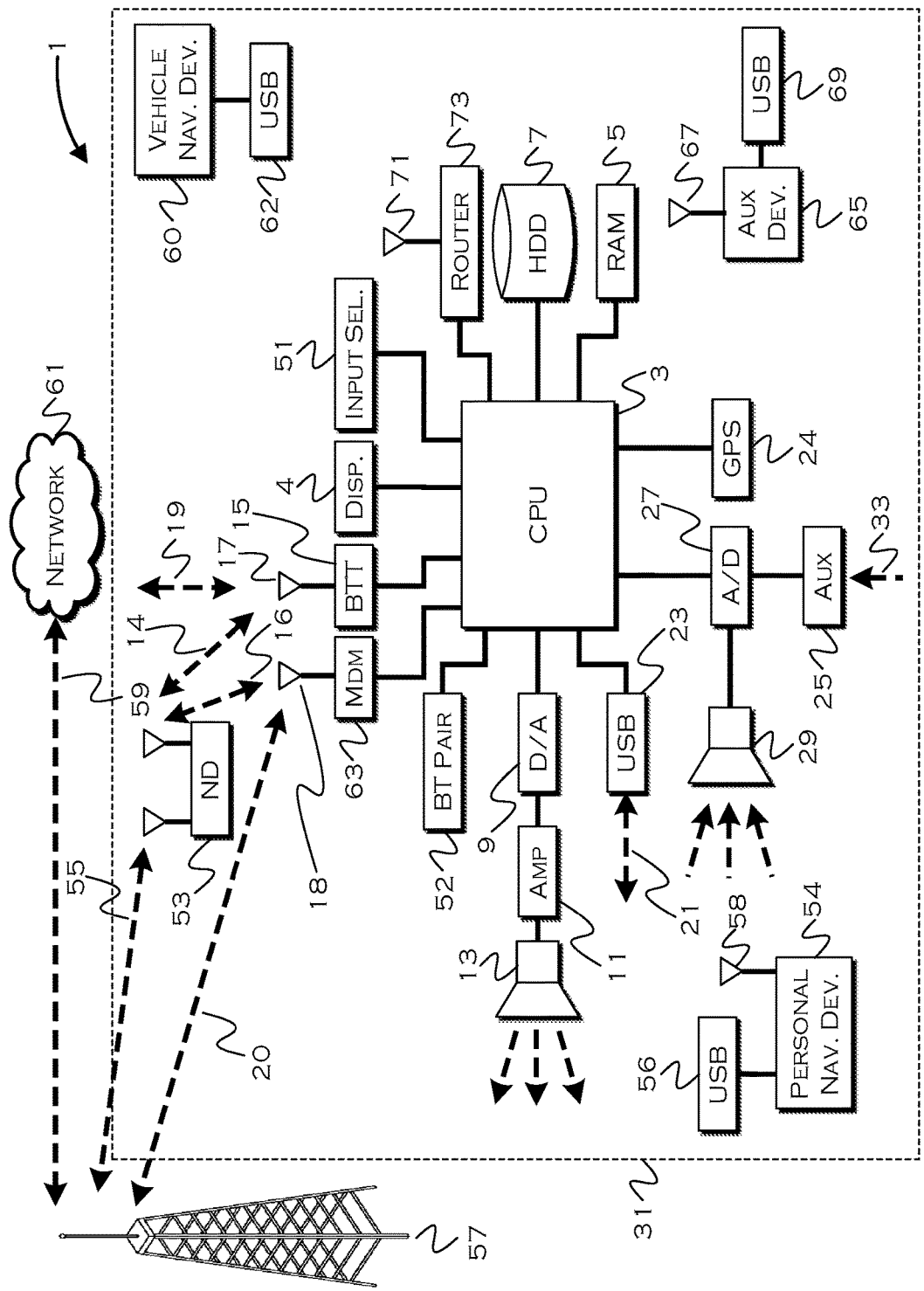
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In many instances of vehicle problems (e.g., low oil, flat tire, or even more complicated seeming problems) a user can fix the issue with either a proper skill set or the aid of a skilled mechanic. Since most users lack the skill set, and most mechanics do not provide on-site service, a user is forced to take a vehicle in for servicing for fixing even the simplest of tasks.

In alternative scenarios, a vehicle manufacturer may dispatch a technician, but the technician may take over an hour to arrive, only to discover that the fix required takes several minutes and could easily have been performed by the user had the user known what to do. This can irritate both the user who waited and the technician who traveled the long distance to the user.

In the illustrative embodiments, the user is able to communicate with a remote assistance process, which may include live assistance from a skilled technician. The user provides a set of vehicle data usable to diagnose a problem, often under the guidance of a technician or remote assistant computer. The data is then used to diagnose the problem, and the user can then be instructed on how to fix the problem without requiring a technician on site. Even if a technician is dispatched, the user can try to fix the problem before the technician arrives.

Figure 2:
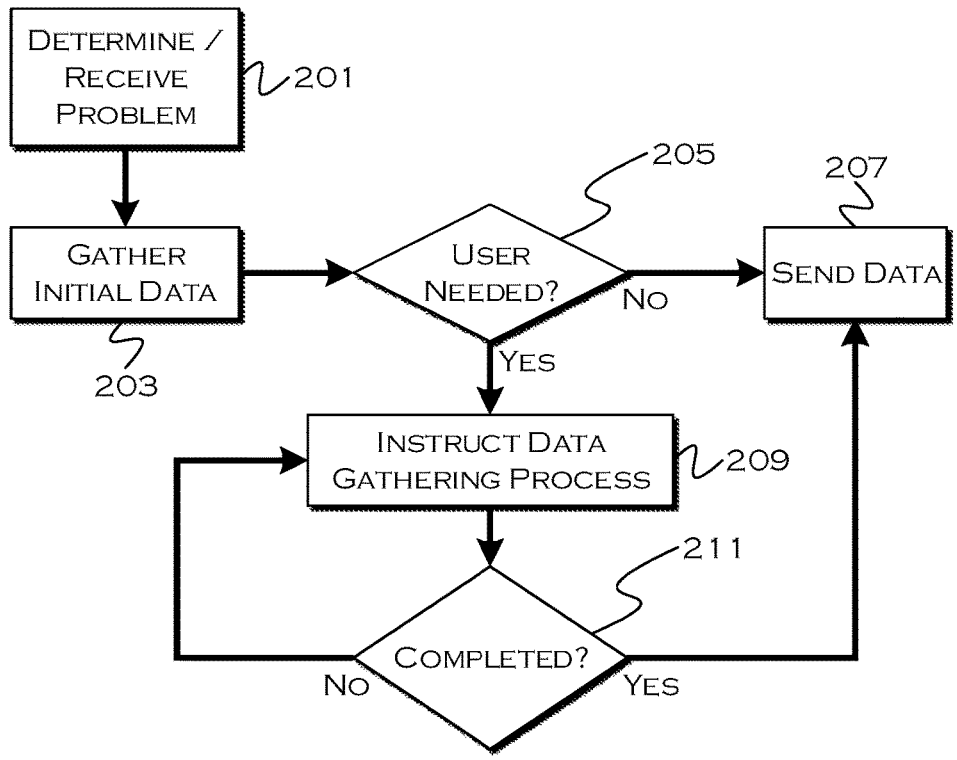
FIG. 2 shows a diagnostic gathering process.

FIG. 2 shows a diagnostic gathering process. In this illustrative example, the vehicle or a remote diagnostic system receives 201 diagnostic data indicative of a problem. The received data can also include sensor data, and generally is any data that could indicate a potential problem. The problem may have typical data associate therewith, and the process can engage 203 in gathering this typical data as well. For example, if the diagnostic code indicates that there is a tire problem, the data could be tire pressure, alignment data and any other tire-related data that can help diagnose the problem.

Figure 4:
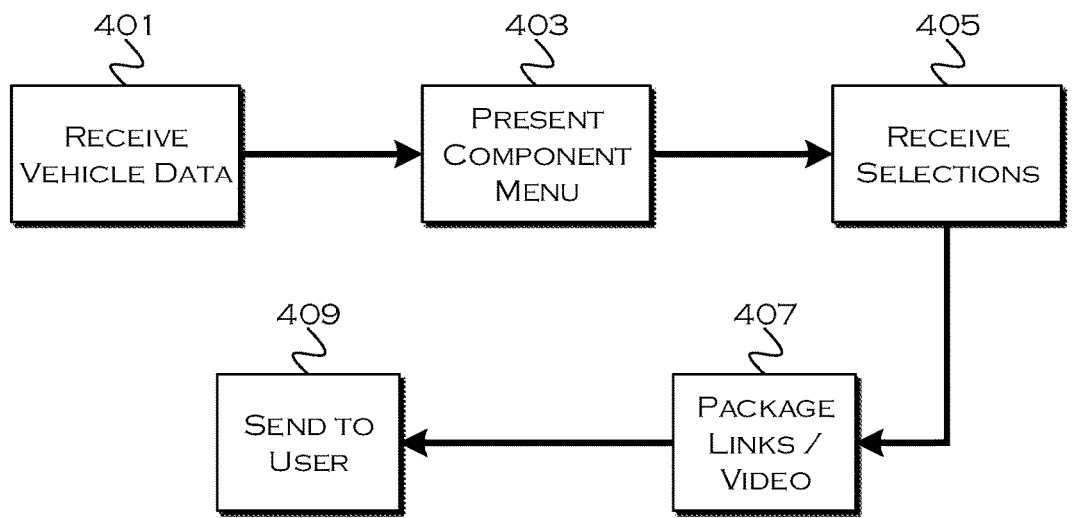
FIG. 4 shows an illustrative remote instruction provision process.

In some instances, onboard vehicle sensors are insufficient to gather the requisite data. In those instances, user assistance 205 may be needed to gather the data. For example, with regards to tire data, if the tire is unexpectedly low, the user may be asked to record video of the tire and to check the tire for leaks. In the case of engine problems, the user may be asked to record engine video and/or sounds, and send the data with the sensor diagnostic data. Since many people may have no idea how to check a tire for leaks or to record engine video or sounds (of the appropriate portions of the engine, for example), the process may provide 209 a set of data gathering instructions. FIG. 4 discusses this process in more detail, but, for example, the instructions could include text or video (or links to either) that told the user to pour a bottle of water over the tire and look for bubbles, or move the user hand over the surface of the tire, feeling for air currents or listening for hissing. The user may also be asked to move the vehicle forward slightly in case a leak is currently contacting the ground.

In some instances, the user may be instructed to capture an image of a component or fluid level, and the instructions can include a picture of the component, or even a wire-frame which the user could line up around the component to ensure the correct angle and image is taken. All of this can provide both useful diagnostic information and can help an unskilled user to quickly and effectively provide the requisite diagnostic assistance. Once all requested data has been gathered 211, the process can send 207 the data to a remote server or assistant for diagnosis and assistance instruction.

Figure 3:
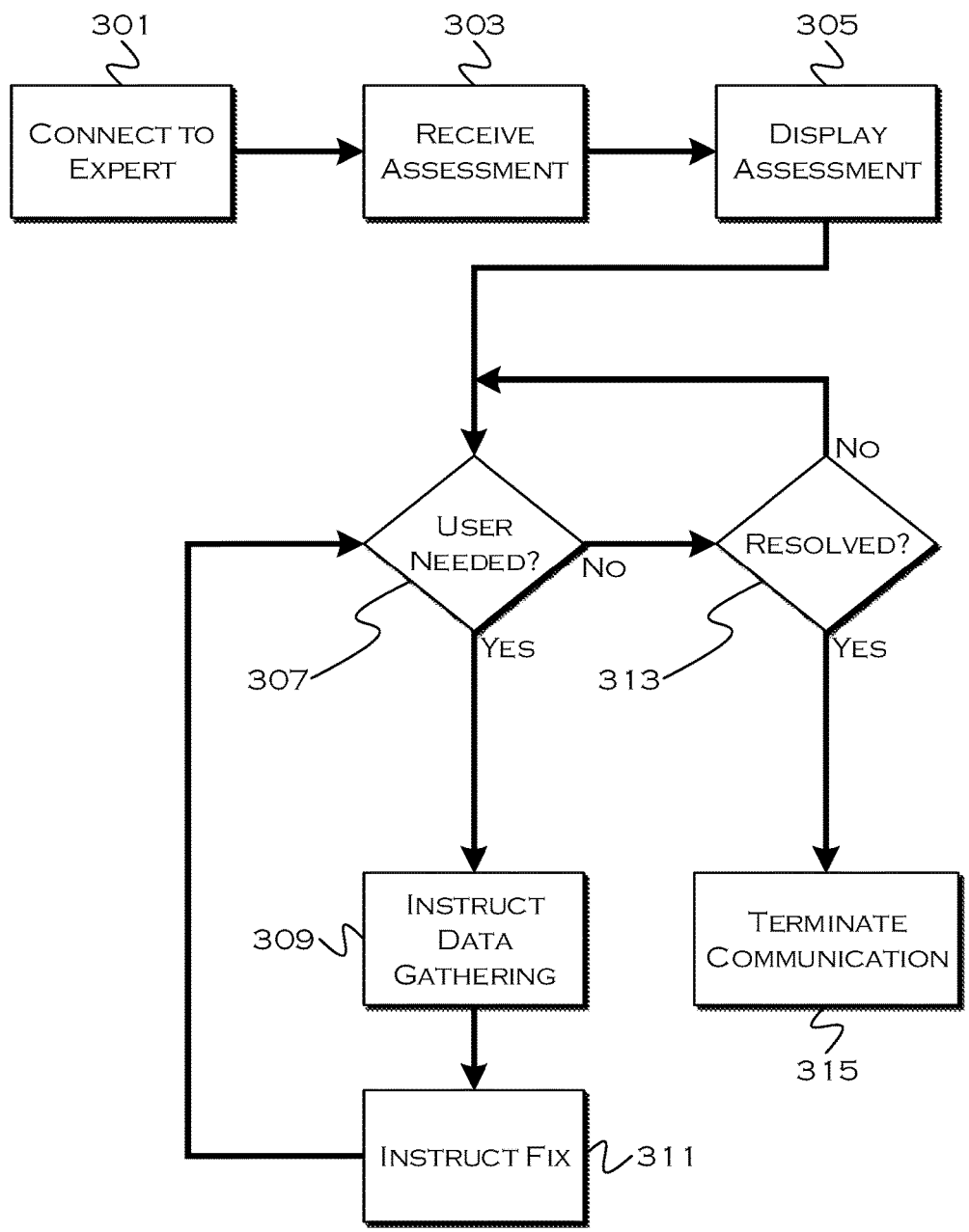
FIG. 3 shows an illustrative remote assistance process.

FIG. 3 shows an illustrative remote assistance process. In this example, the process connects 301 to an assistance expert, which is often a mechanic or other person familiar with fixing vehicle issues. This occurs after the initial diagnostic data is gathered, but the process can still include additional user-assisted data gathering, since the assisting party may still want to see more information before completing a diagnosis. For example, a problem that appears to be mechanical may be the result of ice formed on the axle and in the wheel wells, and the remote assistant may request images of these components before deciding that a more serious problem may exist.

After the vehicle connects to the expert (which could be a person or a digital assistant), the process receives 303 an assessment of the problem. The process displays 305 the assessment, on an in-vehicle display or a mobile device display, which could include a cellular phone or tablet connected to a vehicle computer. As noted, the expert may require additional information which can only be gathered by a user 307, and in those cases the process may instruct 309 the user to gather the additional data. The expert may also provide 311 a set of fixes for the user to attempt on the vehicle, which may assist in rectifying the problem.

Both the fixes and data gathering instructions may take the form of video, audio or images. If the expert instructs the user to tighten a bolt, a video of how to find the bolt, accompanying audio and an image of the bolt may be provided. Custom graphics and links can also be provided, so the user has a "menu" of fix options (e.g., select to see a video, hear audio, see images, etc.) A set of instructions may also include individual videos linked thereto, so the user can either read the instructions and perform the methods thereof, or click on a given instruction to see video of how to perform the process.

For example, if the expert wanted to see an image of the vehicle battery, the instructions could read: 1) Open hood; 2) Locate battery; 3) Capture top-down image of the battery. Since the user may not even know how to open the hood, clicking on the first instruction could show a video and/or image of the hood release, including both an interior release and how to unlatch the exterior hook holding the hood in place. Since the process can know the user's vehicle make/model, the video could be customized to the exact vehicle being driven, as opposed to more generalized instructions.

If the user did not understand the top-down image capture instruction, clicking on the instruction could provide a sample image of the battery, and could even include a wireframe or outline to line up with the battery. Again, since the make and model is known, the images could be samples of the exact vehicle type, and the wireframe could even include portions of other expected vehicle components usable to properly align a device camera. The same process can be undertaken for repair instructions, with images, audio and video to assist the user. The mobile device could even stream live data to the expert, so the expert could walk the user through a video.

If the mobile device is live-streaming video, the expert can have the user, for example, scan a camera over an engine compartment, and say instructions like "stop and move the camera back to the left," until the user is showing the expert the precise component of issue. This live-stream capability can be of great use to a user working with a live expert especially, as it can allow the live expert to virtually instruct an exact series of steps which may not be provided in an existing video library.

Once the problem has been resolved 313 via the instructions, the process can terminate the connection, and the user can provide feedback. The user may also be provided with one or more steps to ensure the problem is fixed, and/or the remote assistant can send a diagnostic request to the vehicle to see if the appropriate result is returned.

FIG. 4 shows an illustrative remote instruction provision process. In this illustrative example, the process assembles a series of instructions (video, audio, images) based on expert user instructions and/or preloaded diagnostic sets. The remote process receives 401 vehicle diagnostics and determines the problem (or is told the problem by a remote expert).

The process may then present 403 an expert with a component menu, including video and images preassembled in a library, which also relate to the current problem. For example, if the problem is a tire problem, a library of tire fix videos, further tire diagnostic instructions, flat tire images, etc., can be provided. The expert, or an automatic process, may select 405 a series of images, audio and video from the menu to accompany any instructions.

For example, if the expert is a person, the expert may want an image of the wheel well and the axle, so the expert may select videos corresponding to data gathering on both components, and there may be some predefined text instructions associated with the data (e.g., "locate and capture an image of the wheel well," "locate and capture an image of the front axle.") The expert could amend the text as needed, and the text would link to a video or image as appropriate.

In the automated version of the same process, an automatic diagnosis could result in similar instructions, predesignated as the "next step" for certain issues. The automated process would use pre-associated instructions to assemble and send a set of images and videos corresponding to a fix.

The remote library process can receive user or automatic selections of images, audio and video, and can package 407 the data into a user package, which the process then sends 409 to the user. Whether links or full data are sent could depend on a variety of variables, including size, bandwidth, available data, connection speed, etc.

The illustrative embodiments allow for users to receive remote diagnostic and repair assistance, effectively allowing a user to address many problems without leaving the comfort of their own home, or to attempt to fix problems while waiting for a technician to arrive. This can result in significant savings of time, cost and angst.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a vehicle diagnostic report from a vehicle;
determine that additional information is required to diagnose a problem indicated by the report;
compile instructions for a user to gather the additional information; and
send the instructions to the vehicle in response to determining the additional information.

2. The system of claim 1, wherein the processor is configured to contact a designated expert party in response to receiving the report.

3. The system of claim 2, wherein the processor is configured to determine that additional information is required based on an indicator received from the expert.

4. The system of claim 2, wherein the processor is configured to compile instructions based on an indicator received from the expert.

5. The system of claim 4, wherein the indicator includes selection of a precompiled video on how to gather the additional information to be included in the instructions.

6. The system of claim 4, wherein the indicator includes selection of precompiled audio on how to gather the additional information to be included in the instructions.

7. The system of claim 4, wherein the indicator includes selection of a precompiled image showing a component to be included in the instructions.

8. The system of claim 1, wherein the instructions include precompiled video on how to gather the additional information.

9. The system of claim 1, wherein the instructions include precompiled audio on how to gather the additional information.

10. The system of claim 1, wherein the instructions include a precompiled image showing a component to which the diagnostic data relates.

11. A system comprising:
a processor configured to:
receive a vehicle diagnostic report from a vehicle;
determine a procedure to correct a problem indicated by the report;
compile instructions for a user to complete the procedure; and
send the instructions to the vehicle in response to determining the procedure.

12. The system of claim 11, wherein the processor is configured to contact a designated expert party in response to receiving the report.

13. The system of claim 12, wherein the processor is configured to compile instructions based on an indicator received from the expert.

14. The system of claim 13, wherein the indicator includes selection of a precompiled video on how to correct the problem to be included in the instructions.

15. The system of claim 13, wherein the indicator includes selection of precompiled audio on how to correct the problem to be included in the instructions.

16. The system of claim 13, wherein the indicator includes selection of a precompiled image showing a component to be included in the instructions.

17. The system of claim 11, wherein the instructions include precompiled video on how to correct the problem.

18. The system of claim 11, wherein the instructions include precompiled audio on how to correct the problem.

19. The system of claim 11, wherein the instructions include a precompiled image showing a component with which the user should interact to correct the problem.

20. A computer-implemented method comprising:
connecting to a predesignated expert in response to receiving a vehicle diagnostic report from a vehicle;
receiving selection, from the expert, of at least one of video, audio, and images explaining how to fix a problem indicated by the diagnostic report;

transmitting instructions from the expert on how to fix the problem, including selected video, audio, or images, to the vehicle; and providing live communication between the vehicle and the expert.

\* \* \* \* \*